(12) United States Patent
Amini et al.

(10) Patent No.: US 12,361,307 B2
(45) Date of Patent: Jul. 15, 2025

(54) VIBRATION MITIGATION WITH OPTICAL FOLDING

(71) Applicant: IonQ, Inc., College Park, MD (US)

(72) Inventors: Jason Madjdi Amini, Takoma Park, MD (US); Kai Makoto Hudek, Hyattsville, MD (US); Sarah Margaret Kreikemeier, Washington, DC (US)

(73) Assignee: IonQ, Inc., College Park, MD (US)

( * ) Notice: Subject to any disclaimer, the term of this patent is extended or adjusted under 35 U.S.C. 154(b) by 650 days.

(21) Appl. No.: 17/832,000

(22) Filed: Jun. 3, 2022

(65) Prior Publication Data

US 2023/0394346 A1 Dec. 7, 2023

(51) Int. Cl.
*G06N 10/40* (2022.01)

(52) U.S. Cl.
CPC .................... *G06N 10/40* (2022.01)

(58) Field of Classification Search
CPC .................................................. G06N 10/40
See application file for complete search history.

(56) References Cited

U.S. PATENT DOCUMENTS

2020/0023462 A1* 1/2020 Amini ................... G02F 1/33
2020/0028312 A1* 1/2020 Monroe ............... G02B 7/1827

* cited by examiner

*Primary Examiner* — Nghia M Doan
(74) *Attorney, Agent, or Firm* — ARENTFOX SCHIFF LLP

(57) ABSTRACT

Aspects of the present disclosure relate generally to systems and methods for use in the implementation and/or operation of quantum information processing (QIP) systems. Coherent optical manipulations in such QIP systems may require interferometric stability between the incident laser beams and the atomic-based qubit (or other type of qubit) being addressed. Mechanical vibrations that affect the position of the qubit with respect to the incident laser beams directly contribute to optical phase differences and reduce fidelity. A technique is described herein that is used to mitigate or reduce optical phase differences arising from vibrations of the qubits with respect to the incident laser beams. This technique is generally applicable to any condition that results in such vibrations and systems needing interferometric stability and is compatible with cryogenic environments.

20 Claims, 10 Drawing Sheets

VIBRATION MITIGATION WITH OPTICAL FOLDING

TECHNICAL FIELD

Aspects of the present disclosure relate generally to systems and methods for use in the implementation and/or operation of quantum information processing (QIP) systems.

BACKGROUND

Trapped atoms are one of the leading implementations for quantum information processing or quantum computing. Atomic-based qubits may be used as quantum memories, as quantum gates in quantum computers and simulators, and may act as nodes for quantum communication networks. Qubits based on trapped atomic ions enjoy a rare combination of attributes. For example, qubits based on trapped atomic ions have very good coherence properties, may be prepared and measured with nearly 100% efficiency, and are readily entangled with each other by modulating their Coulomb interaction with suitable external control fields such as optical or microwave fields. These attributes make atomic-based qubits attractive for extended quantum operations such as quantum computations or quantum simulations.

It is therefore important to develop new techniques that improve the design, fabrication, implementation, and/or control of different QIP systems used as quantum computers or quantum simulators, and particularly for those QIP systems that handle operations based on atomic-based qubits.

SUMMARY

The following presents a simplified summary of one or more aspects to provide a basic understanding of such aspects. This summary is not an extensive overview of all contemplated aspects and is intended to neither identify key or critical elements of all aspects nor delineate the scope of any or all aspects. Its sole purpose is to present some concepts of one or more aspects in a simplified form as a prelude to the more detailed description that is presented later.

This disclosure describes various aspects of methods and system for vibration mitigation with optical folding in QIP systems. These vibration mitigation techniques may be used in connection with low temperature operations such as those in cryogenic environments.

Aspects of the present disclosure describe a device or structure for reducing the effects of mechanical vibrations on qubit fidelity. The device or structure is configured to receive two or more parallel optical beams and is further configured to provide optical paths for the two or more parallel optical beams that minimize or reduce the introduction of phase differences to the optical beams provided to a qubit as a result of movement, including translational movement. The device or structure includes a confining device (e.g., a trap) configured to hold one or more qubits, including the qubit described above, in specified positions. The device or structure further includes one or more mirrors (or other types of devices with similar optical functionality) that are configured to compensate for the effects of mechanical vibrations or translations. The device or structure may include a platform onto which the confining device and the one or more mirrors are rigidly attached. The overall configuration of the device or structure is such as to allow any two optical beams that are received in parallel and are to be provided to a particular qubit held by the confining device to be provided in such a way that compensates for mechanical vibrations. One such way is to have the confining device and the one or more mirrors move in a common motion.

In an aspect, the device or structure includes a platform, one or more folding mirrors, and a confining device (e.g., a trap) configured to hold a qubit in a position. The one or more folding mirrors may include a single folding mirror, or alternatively, the one or more folding mirrors may include a first folding mirror and a second folding mirror (although more than two folding mirrors may also be used). The folding mirrors and the confining device are rigidly attached to the platform. The platform may receive many parallel optical beams. In one example, the platform receives two parallel optical beams (a first optical beam and a second optical beam) and the first folding mirror is configured to receive the first optical beam and redirect the first optical beam to the qubit, the second folding mirror is configured to receive the second optical beam and redirect the second optical beam to the qubit. The term redirect may refer to changing a direction of an optical beam, with the terms folding and bending being used in a similar manner in this disclosure. In some aspects, the first optical beam is redirected towards the qubit in a direction different from the direction in which the second optical beam is redirected towards the qubit. These directions may be opposite each other or may be angled with respect to each other.

In an aspect of this device or structure, movement of the platform (e.g., from mechanical vibrations) moves the confining device (and thus the qubit(s)) and the folding mirrors in a common motion.

In an aspect of this device or structure, the qubit is sensitive to phase differences of the two optical beams at the qubit and the qubit requires interferometric stability of the two optical beams at the qubit to operate with good fidelity.

In an aspect of this device or structure, translational movement of the platform does not result in an optical phase difference between a first optical beam and a second optical beam at the qubit, where one or both beams are redirected towards the qubit. This removes or reduces the effect of translational movement of the platform on qubit fidelity.

In an aspect of this device or structure, common translational movement of the source of the first optical beam and the source of the second optical beam does not result in an optical phase difference between the first optical beam and the second optical beam at the qubit. This removes or reduces the effect of common translation movements of the sources on qubit fidelity.

In an aspect of this device or structure, a first optical beam and a second optical beam are parallel, that is, they considered to be side by side and have a same distance continuously between them when received at the device or structure. Where two folding mirrors are used, the first folding mirror and the second folding mirror are positioned and angled to redirect the first optical beam and the second optical beam, respectively, to the qubit. The folding mirrors may both be positioned at 45 degrees to a respective first optical path and a second optical path. More generally, one or more mirrors may be positioned at angles of 45 degrees (45-degree angles) or at angles other than 45 degrees as needed to redirect one or both of the first optical beam and the second optical beam to the qubit.

In an aspect of this device or structure, instead of using two folding mirrors as described above, a single folding mirror may be used when only one of the optical beams needs to be redirected for both optical beams to overlap at the qubit (e.g., one of the optical beams is provided directly to the qubit). Moreover, instead of using two folding mirrors as described above, three or more folding mirrors may be used where the three or more folding mirrors may be configured such that the first optical beam and the second optical beam are provided to the qubit. In some cases, the device or structure configuration may be such that the first optical beam and the second optical beam may share one or more of the folding mirrors on the platform.

In an aspect of this device or structure, the confining device may hold multiple qubits. Accordingly, there may be more than two optical beams being received, where any one qubit may receive at least two of the optical beams. In such a case, the folding mirrors may be used to redirect, where appropriate, some or all of the optical beams to the respective qubits.

In an aspect of this device or structure, the platform is configured to be placed inside a chamber or cryogenic environment in a QIP system.

In an aspect of this device, the qubit is an ion, and the first optical beam and the second optical beam are Raman optical beams. The ion may be an ytterbium ion or a barium ion and the confining device is an ion trap. The ion trap may be a surface trap made of evaporated electrodes on a glass substrate.

In an aspect of this device or structure, the qubit may be a neutral atom, a Rydberg atom, a defect-based qubit, a quantum dot, or a semiconductor-based qubit.

In an aspect of this device or structure, the confining device is further configured to hold additional qubits in respective positions. Where two folding mirrors are used, the first folding mirror may be further configured to receive as inputs additional first optical beams and redirect the additional first optical beams to the respective qubit of the additional qubits, and the second folding mirror may be further configured to receive as inputs additional second optical beams and redirect the additional second optical beams to the respective qubit of the additional qubits. The qubit and the additional qubits may be ions where the ions are all of the same atomic species, a mix or combination of different atomic species, a mix or combination of different isotopes of the same atomic species, or a mix or combination of atomic species and isotopes. The types of qubits used for the qubit and the additional qubits may be neutral atoms, Rydberg atoms, defect-based qubits, quantum dots, or semiconductor-based qubits. The qubit and the additional qubits may be a mix or combination of the types of qubits described above.

In an aspect of this device or structure, where two parallel optical beams are received and both are redirected, the direction of the redirected first optical beam and the direction of the redirected second optical beam may be in opposite directions or may be at an angle to each other.

In an aspect of this device or structure, the confining device is further configured to hold additional qubits in respective positions. Where at least two parallel optical beams are received, including a first optical beam and a second optical beam, the first optical beam may overlap two or more ions, the second optical beam may overlap two or more ions, or both the first optical beam and the second optical beam may overlap two or more ions.

In an aspect of this device or structure, the platform is mechanically decoupled from the source of the first optical beam and from the source of the second optical beam.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings or figures is intended as a description of various configurations or implementations and is not intended to represent the only configurations or implementations in which the concepts described herein may be practiced. The detailed description includes specific details for the purpose of providing a thorough understanding of various concepts. However, it will be apparent to those skilled in the art that these concepts may be practiced without these specific details or with variations of these specific details. In some instances, well known components are shown in block diagram form, while some blocks may be representative of one or more well-known components.

Some operations performed in atomic-based QIP systems rely on the implementation and use of Raman laser setups. Coherent optical manipulations in such setups may require interferometric stability between the incident laser beams and the ion or neutral atom being addressed. Interferometric stability may refer to minimizing or avoiding the introduction of unintended or unwanted phase differences. Mechanical vibrations that affect the position of the ion or neutral atom with respect to the incident laser beams directly may contribute to optical phase differences and reduce fidelity. This issue can also affect QIP systems that use qubits that require interferometric stability but where those qubits are not atomic-based and are instead based on other types of technologies (e.g., photonic qubits, synthetic or manufactured qubits). Typically, these effects may be mitigated through making elements rigid and isolating them from the environment.

This problem, however, is exacerbated by introducing a cryogenic environment, where, due to the active nature of the cryogenic cooling process, vibrations are now directly injected into the system. QIP systems may use cryogenic environments (e.g., cryostats or cryogenic chambers) to improve operational performance. One example is for operations to be performed at environments of approximately 4 Kelvin. This can be achieved by having one or more temperature stages. For example, a first stage or first environment may be at 40 Kelvin, and a second stage or second environment within the first stage may be at 4 Kelvin. Other implementations with more than two stages are also possible. Some QIP systems that use trapped ions as qubits may have the ions inside a cryogenic environment and, as a result, those ions may be affected by vibrations or translations from mechanical operations used to achieve the lower temperatures.

Solutions to the issues described above are explained in more detail in connection with FIGS. 1-10, with FIGS. 1-3 providing a background of QIP systems or quantum computers, and more specifically, of atomic-based QIP systems or quantum computers for illustrative purposes.

Figure 1:
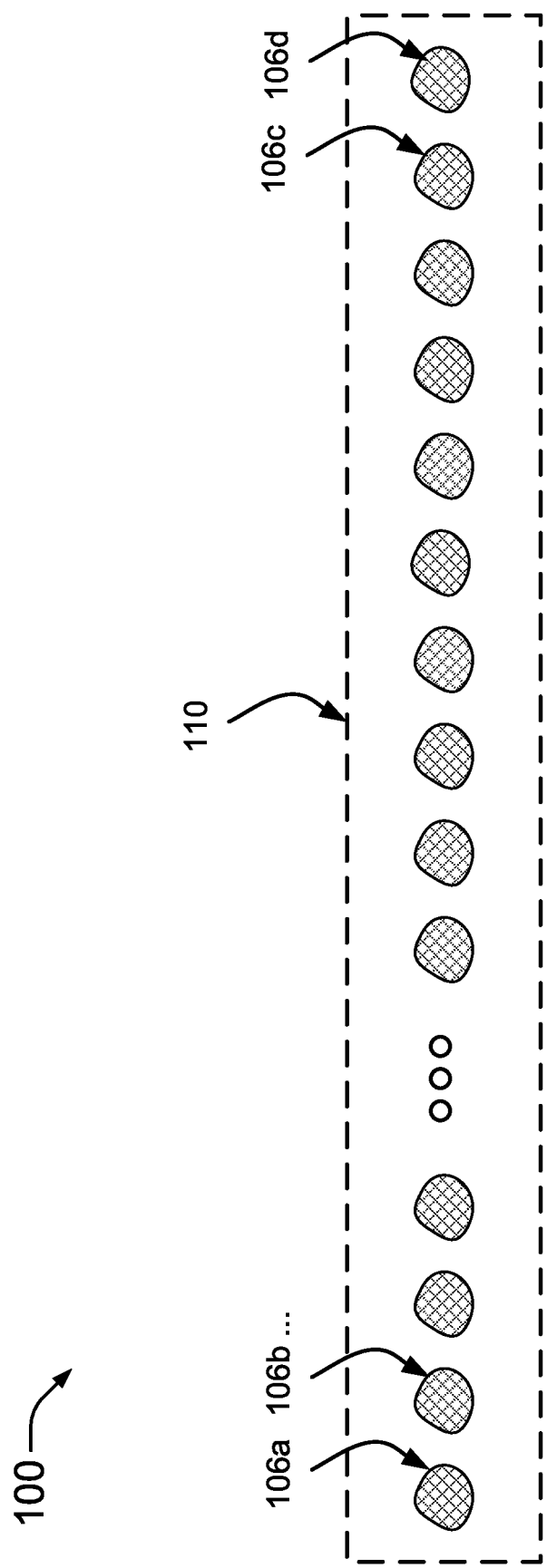
FIG. 1 illustrates a view of atomic ions a linear crystal or chain in accordance with aspects of this disclosure.
Figure 2:
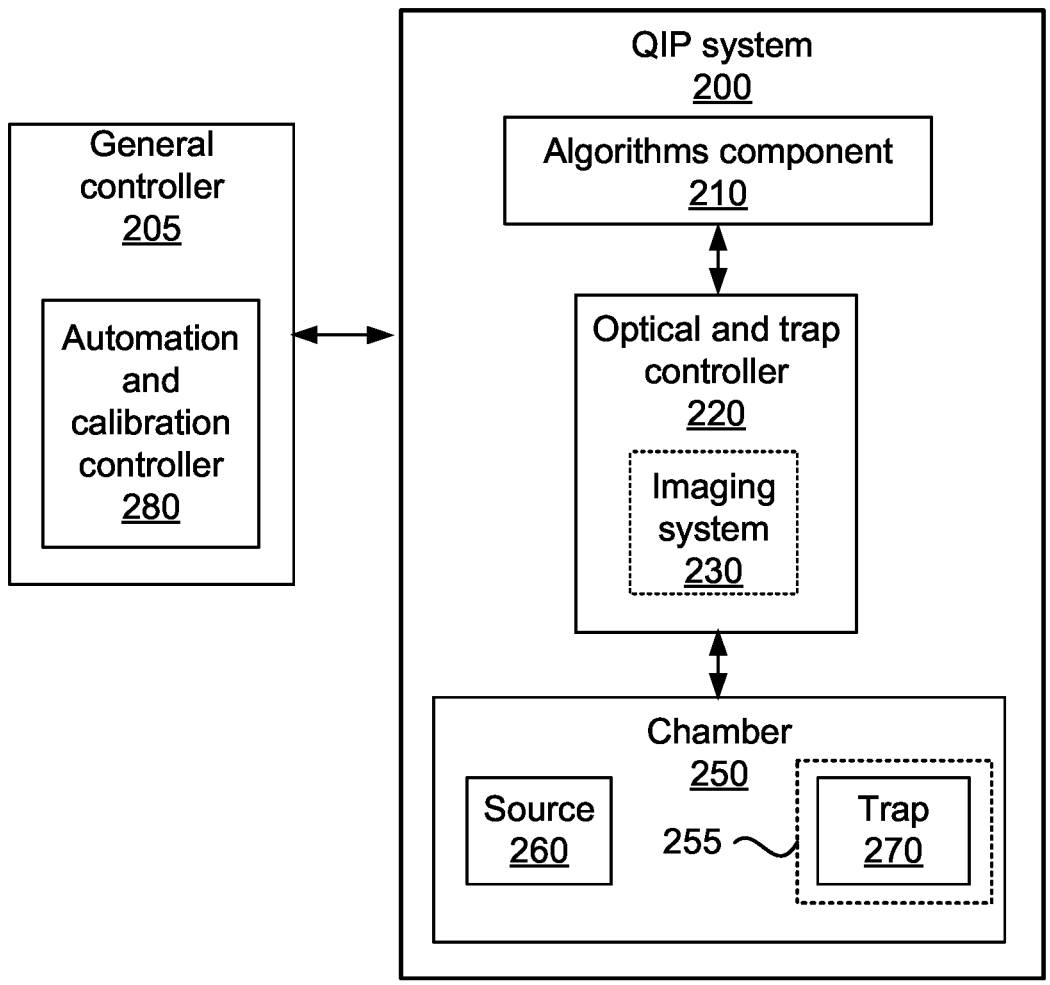
FIG. 2 illustrates an example of a quantum information processing (QIP) system in accordance with aspects of this disclosure.

FIG. 1 illustrates a diagram 100 with multiple atomic ions 106 (e.g., atomic ions 106a, 106b, . . . , 106c, and 106d) trapped in a linear crystal or chain 110 using a trap (the trap can be inside a vacuum chamber as shown in FIG. 2). The trap may be referred to as an ion trap. The ion trap shown may be built or fabricated on a semiconductor substrate, a dielectric substrate, or a glass die or wafer (also referred to as a glass substrate). The atomic ions 106 may be provided to the trap as atomic species for ionization and confinement into the chain 110.

In the example shown in FIG. 1, the trap includes electrodes for trapping or confining multiple atomic ions into the chain 110 with the ions laser-cooled to be nearly at rest. The number of atomic ions trapped can be configurable and more or fewer atomic ions may be trapped. The atomic ions can be ytterbium ions (e.g., $^{171}Yb^+$ ions), for example. The atomic ions are illuminated with laser (optical) radiation tuned to a resonance in $^{171}Yb^+$ and the fluorescence of the atomic ions is imaged onto a camera or some other type of detection device. In this example, atomic ions may be separated by about 5 microns (μm) from each other, although the separation may be smaller or larger than 5 μm. The separation of the atomic ions is determined by a balance between the external confinement force and Coulomb repulsion and does not need to be uniform. Moreover, in addition to atomic ytterbium ions, neutral atoms, Rydberg atoms, different atomic ions or different species of atomic ions may also be used (e.g., any one of different barium isotopes such as barium-133 or barium-137). The trap may be a linear RF Paul trap, but other types of confinement may also be used, including optical confinement. Thus, a confinement device may be based on different techniques and may hold ions, neutral atoms, or Rydberg atoms, for example, with an ion trap being one example of such a confinement device. The ion trap may be a surface trap, for example.

It is to be understood that the chain 110 of ions 106 is provided by way of an example of an arrangement in which qubits (e.g., the ions 106) are confined in a particular position or location by using a trap. A similar situation may occur when trapping or confining neutral atoms or other types of qubits. Moreover, qubits based on semiconductor devices may also be confined to a particular position, location, or place from the way the system containing such devices is constructed. In any of these examples, if the qubit is sensitive to phase differences and requires interferometric stability to operate at high fidelity, mechanical vibrations that affect the position of the qubit can result in lower fidelity for the qubit. Accordingly, the techniques described herein to improve fidelity in the presence of mechanical vibrations are applicable to any type of qubit that may require interferometric stability.

FIG. 2 is a block diagram that illustrates an example of a QIP system 200 in accordance with various aspects of this disclosure. The QIP system 200 may also be referred to as a quantum computing system, a quantum computer, a computer device, a trapped ion system, or the like. The QIP system 200 may be part of a hybrid computing system in which the QIP system 200 is used to perform quantum computations and operations and the hybrid computing system also includes a classical computer to perform classical computations and operations.

Shown in FIG. 2 is a general controller 205 configured to perform various control operations of the QIP system 200. Instructions for the control operations may be stored in memory (not shown) in the general controller 205 and may be updated over time through a communications interface (not shown). Although the general controller 205 is shown separate from the QIP system 200, the general controller 205 may be integrated with or be part of the QIP system 200. The general controller 205 may include an automation and calibration controller 280 configured to perform various calibration, testing, and automation operations associated with the QIP system 200.

The QIP system 200 may include an algorithms component 210 that may operate with other parts of the QIP system 200 to perform quantum algorithms or quantum operations, including a stack or sequence of combinations of single qubit operations and/or multi-qubit operations (e.g., two-qubit operations) as well as extended quantum computations. As such, the algorithms component 210 may provide instructions to various components of the QIP system 200 (e.g., to the optical and trap controller 220) to enable the implementation of the quantum algorithms or quantum operations. The algorithms component 210 may receive information resulting from the implementation of the quantum algorithms or quantum operations and may process the information and/or transfer the information to another component of the QIP system 200 or to another device for further processing.

The QIP system 200 may include an optical and trap controller 220 that controls various aspects of a trap 270 (or other confinement device) in a chamber 250, including the generation of signals to control the trap 270 and to control the operation of lasers and optical systems that provide optical beams that interact with the atomic-based qubits in the trap. When used to confine or trap ions, the trap 270 may be referred to as an ion trap. The trap 270, however, may also be used to trap neutral atoms, Rydberg atoms, different atomic ions or different species of atomic ions. The lasers and optical systems can be at least partially located in the optical and trap controller 220 and/or in the chamber 250. For example, optical systems within the chamber 250 may refer to optical components or optical assemblies.

The QIP system 200 may include an imaging system 230. The imaging system 230 may include a high-resolution imager (e.g., CCD camera) or other type of detection device (e.g., photomultiplier tube or PMT) for monitoring the atomic ions while they are being provided to the trap 270 and/or after they have been provided to the trap 270. In an aspect, the imaging system 230 can be implemented separate from the optical and trap controller 220, however, the use of fluorescence to detect, identify, and label atomic ions using image processing algorithms may need to be coordinated with the optical and trap controller 220.

In addition to the components described above, the QIP system 200 can include a source 260 that provides atomic species (e.g., a plume or flux of neutral atoms) to the chamber 250 having the trap 270. When atomic ions are the basis of the quantum operations, that trap 270 confines the atomic species once ionized (e.g., photoionized). The trap 270 may be part of a processor or processing portion of the QIP system 200. That is, the trap 270 may be considered at the core of the processing operations of the QIP system 200 since it holds the atomic-based qubits that are used to perform the quantum operations or simulations. At least a portion of the source 260 may be implemented separate from the chamber 250.

In an example, the chamber 250 may include a cryogenic environment 255 within which the trap 270 is placed. As mentioned above, the cryogenic environment 255 may include multiple stages with different temperatures and the trap 270 may be placed or positioned within the stage with the lowest temperature (e.g., 4K). The cryogenic environment 255 may also include any electrical, mechanical, and electromechanical components necessary to achieve the appropriate environmental conditions (e.g., temperatures, vacuum, etc.) In some instances, the chamber 250 may be part of a system that provides the various stages and the cryogenic environment 255 is one of the stages provided by the chamber 250. Pumping mechanisms used to provide the appropriate temperatures in the cryogenic environment 255 may produce mechanical vibrations that can affect the location or position of the atomic-based qubits in the trap 270.

It is to be understood that the various components of the QIP system 200 described in FIG. 2 are described at a high-level for ease of understanding. Such components may include one or more sub-components, the details of which may be provided below as needed to better understand certain aspects of this disclosure.

Aspects of this disclosure may be implemented at least partially using the chamber 250, the cryogenic environment 255, and the trap 270.

The QIP system 200 is provided by way of an illustrative example of an atomic-based QIP system (e.g., based on ions, neutral atoms, Rydberg atoms, etc.) where the trap 270 provides a mechanism to hold or confine qubits to a location or position. Mechanical vibrations experienced by these qubits can affect their fidelity because of their need for interferometric stability. Other QIP systems based on different qubit technologies may use different devices or structures to confine the qubits to a location or position. If such qubits also need interferometric stability, then mechanical vibrations experienced by those qubits can also affect their fidelity.

Figure 3:
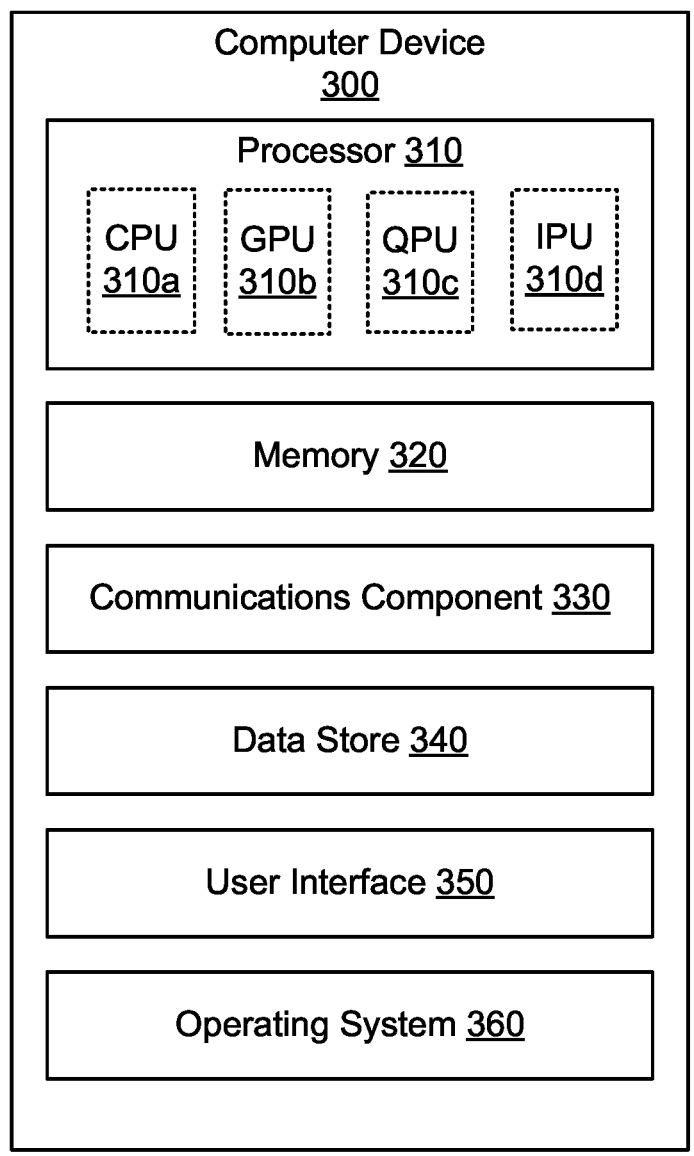
FIG. 3 illustrates an example of a computer device in accordance with aspects of this disclosure.

Referring now to FIG. 3, illustrated is an example of a computer system or device 300 in accordance with aspects of the disclosure. The computer device 300 can represent a single computing device, multiple computing devices, or a distributed computing system, for example. The computer device 300 may be configured as a quantum computer (e.g., a QIP system), a classical computer, or to perform a combination of quantum and classical computing functions, sometimes referred to as hybrid functions or operations. For example, the computer device 300 may be used to process information using quantum algorithms, classical computer data processing operations, or a combination of both. In some instances, results from one set of operations (e.g., quantum algorithms) are shared with another set of operations (e.g., classical computer data processing). A generic example of the computer device 300 implemented as a QIP system capable of performing quantum computations and simulations is, for example, the QIP system 200 shown in FIG. 2.

The computer device 300 may include a processor 310 for carrying out processing functions associated with one or more of the features described herein. The processor 310 may include a single or multiple set of processors or multi-core processors. Moreover, the processor 310 may be implemented as an integrated processing system and/or a distributed processing system. The processor 310 may include one or more central processing units (CPUs) 310$a$, one or more graphics processing units (GPUs) 310$b$, one or more quantum processing units (QPUs) 310$c$, one or more intelligence processing units (IPUs) 310$d$ (e.g., artificial intelligence or AI processors), or a combination of some or all those types of processors. The techniques described herein for mitigating the effects of vibrations on qubit fidelity may be implemented in an atomic-based QPU 310$c$, for example, which may include a chamber with an ion trap. In one aspect, the processor 310 may refer to a general processor of the computer device 300, which may also include additional processors 310 to perform more specific functions (e.g., including functions to control the operation of the computer device 300).

The computer device 300 may include a memory 320 for storing instructions executable by the processor 310 to carry out operations. The memory 320 may also store data for processing by the processor 310 and/or data resulting from processing by the processor 310. In an implementation, for example, the memory 320 may correspond to a computer-readable storage medium that stores code or instructions to perform one or more functions or operations. Just like the processor 310, the memory 320 may refer to a general memory of the computer device 300, which may also include additional memories 320 to store instructions and/or data for more specific functions.

It is to be understood that the processor 310 and the memory 320 may be used in connection with different operations including but not limited to computations, calculations, simulations, controls, calibrations, system management, and other operations of the computer device 300, including any methods or processes described herein.

Further, the computer device 300 may include a communications component 330 that provides for establishing and maintaining communications with one or more parties utilizing hardware, software, and services. The communications component 330 may also be used to carry communications between components on the computer device 300, as well as between the computer device 300 and external devices, such as devices located across a communications network and/or devices serially or locally connected to computer device 300. For example, the communications component 330 may include one or more buses, and may further include transmit chain components and receive chain components associated with a transmitter and receiver, respectively, operable for interfacing with external devices. The communications component 330 may be used to receive updated information for the operation or functionality of the computer device 300.

Additionally, the computer device 300 may include a data store 340, which can be any suitable combination of hardware and/or software, which provides for mass storage of information, databases, and programs employed in connection with the operation of the computer device 300 and/or any methods or processes described herein. For example, the data store 340 may be a data repository for operating system 360 (e.g., classical OS, or quantum OS, or both). In one implementation, the data store 340 may include the memory 320. In an implementation, the processor 310 may execute the operating system 360 and/or applications or programs, and the memory 320 or the data store 340 may store them.

The computer device 300 may also include a user interface component 350 configured to receive inputs from a user of the computer device 300 and further configured to generate outputs for presentation to the user or to provide to a different system (directly or indirectly). The user interface component 350 may include one or more input devices, including but not limited to a keyboard, a number pad, a mouse, a touch-sensitive display, a digitizer, a navigation key, a function key, a microphone, a voice recognition component, any other mechanism capable of receiving an input from a user, or any combination thereof. Further, the user interface component 350 may include one or more output devices, including but not limited to a display, a speaker, a haptic feedback mechanism, a printer, any other mechanism capable of presenting an output to a user, or any combination thereof. In an implementation, the user interface component 350 may transmit and/or receive messages corresponding to the operation of the operating system 360. When the computer device 300 is implemented as part of a cloud-based infrastructure solution, the user interface component 350 may be used to allow a user of the cloud-based infrastructure solution to remotely interact with the computer device 300.

In connection with the systems described in FIGS. 1-3, the present disclosure describes a technique to mitigate optical phase differences arising from vibrations of an ion with respect to incident laser beams where the ion requires interferometric stability to be used as a qubit with good fidelity. This technique is generally applicable to any condition that results in such vibrations of the ion. Moreover, this technique is applicable to any type of qubit (e.g., atomic-based or otherwise) that requires interferometric stability and is therefore affected by mechanical vibrations in the system. Because cryogenic environments tend to generate the types of mechanical vibrations that affect interferometric stability, this technique is compatible with systems that use cryogenic environments.

Figure 4:
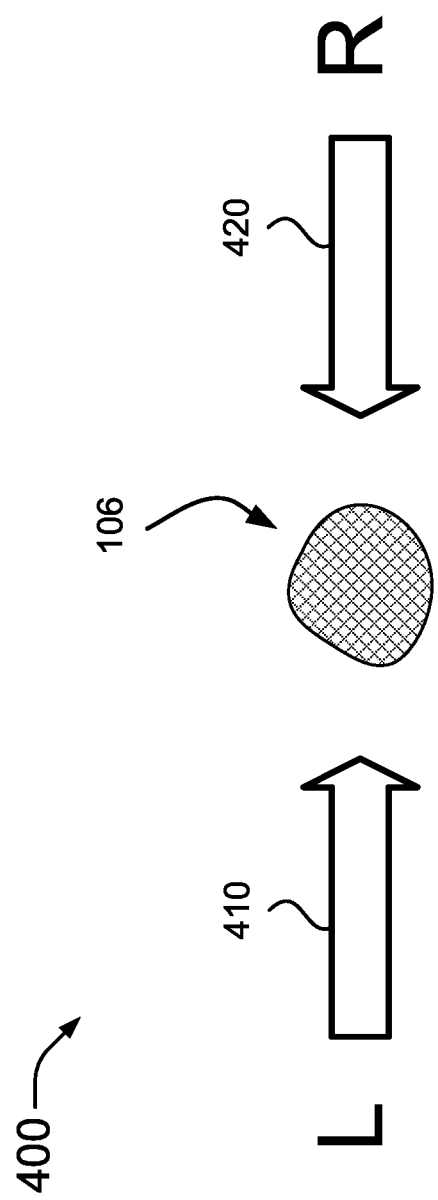
FIG. 4 illustrates an example of a typical geometry of a two-beam Raman process for ions in an ion chain in accordance with aspects of this disclosure.

FIG. 4 includes a diagram 400 that illustrates an example of a typical geometry of a two-beam Raman process for ions in an ion chain (e.g., the ions 106 in the ion chain 110). While the technique described in connection with FIG. 4 and subsequent figures is representative of a mechanism to reduce or remove the effects of mechanical vibrations in ion-based qubits, the same or similar technique is applicable to different types of qubits that require interferometric stability and are faced with mechanical vibrations for different sources, including from the operation of cryogenic environments.

In the diagram 400, Gaussian laser beams are represented by arrows, with a beam coming from the one side (left side) and a beam coming from another side (right side), labeled L (L beam 410) and R (R beam 420), respectively. The L and R beams impinge upon an ion 106 in the center. In this disclosure, the terms ion and qubit may be used interchangeably where appropriate, although the term ion is more generally used in connection with FIGS. 4-10. In this example the L and R beams are coming from opposite directions to the ion 106, although non-opposite directions may be possible. The L and R beams create an interference pattern at the location of the ion 106 with a set phase based on the difference in optical phase of the individual L and R beams. The ion 106 will perceive this as a global phase that can be defined as 0 phase.

It is to be understood that the beam 410 and the beam 420 need not be limited to Gaussian laser beams and can be of any shape.

It is also to be understood that the ion 106 in FIG. 4 may be held in place by using, for example, an ion trap (e.g., the ion trap 270 in FIG. 2) as a confining device, although different types of confining devices may be used. Moreover, although a single ion 106 is shown, the example need not be so limited and additional ions may be aligned with the ion 106 into and/or out of the plane of the diagram 400 (each having a corresponding set of L and R beams). Accordingly, while the concepts described below generally represent the basic example of a pair of L and R beams provided to a single qubit, such concepts can be easily extended to the case where multiple qubits are used and multiple pairs of L and R beams are applied.

Figure 5:
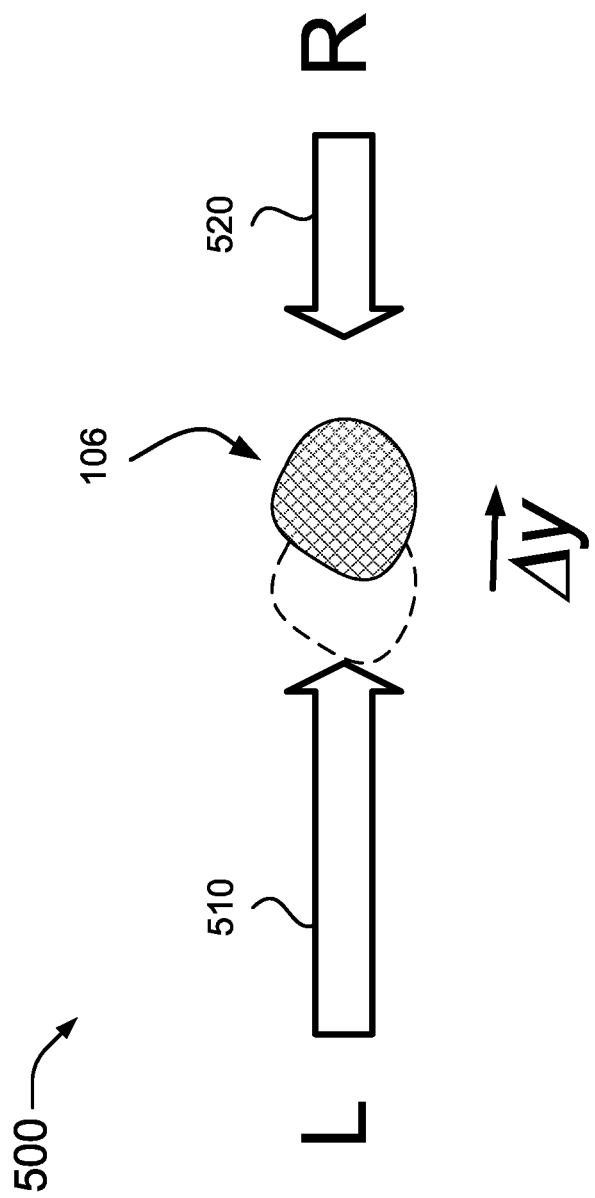
FIG. 5 illustrates an example of change in position of an ion along an optical axis (Y axis) from mechanical vibration or disturbance in accordance with aspects of this disclosure.

FIG. 5 includes a diagram 500 that illustrates an example of change in position of the ion 106 in FIG. 4 along an optical axis (Y axis) from mechanical vibrations, translations, or disturbances on the system (e.g., from vibrations produced by the cryogenic cooling process). The optical axis in this example is along the length of the beams and includes the ion 106. The amount of the change in position is given by $\Delta y$. Dashed lines represent the original position of the ion 106, that is, the position from which the ion 106 moved before reaching its current position (crisscross pattern).

The effect of this disturbance is, in this example, an increase in the path length of the L beam (i.e., the L beam 510) and a decrease in the path length of the R beam (i.e., the R beam 520) from the original lengths in FIG. 4. This is reflected by showing the L beam 510 in FIG. 5 being longer than the L beam 410 in FIG. 4, and the R beam 520 in FIG. 5 being shorter than the R beam 420 in FIG. 4. This changes the phase relationship between the beams as follows:

$$\Delta \varphi = 2 \cdot k \cdot \Delta y,$$

$$k = 2\pi/\lambda.$$

Figure 6:
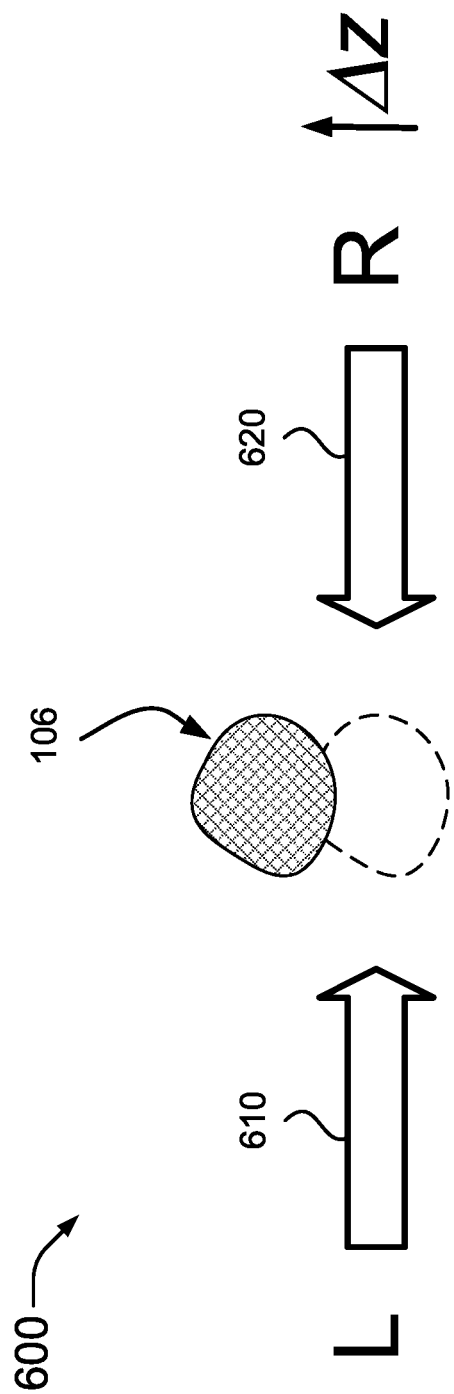
FIG. 6 illustrates an example of change in position of an ion perpendicular to the optical axis (Z axis) from mechanical vibration or disturbance in accordance with aspects of this disclosure.

A disturbance along the one direction perpendicular to the optical axis (Z axis), is shown in connection with a diagram 600 shown in FIG. 6. The amount of the change in position is given by $\Delta z$. Here, there is no change in the optical path length between the L beam (i.e., the L beam 610) and the R beam (i.e., the R beam 620).

For the geometry shown in connection with the diagram 600 in FIG. 6, a similar disturbance along the other direction perpendicular to the optical axis (X axis) will have the same effect as a disturbance along the Z axis, that is, it does not change the optical path length of the two beams.

Figure 7:
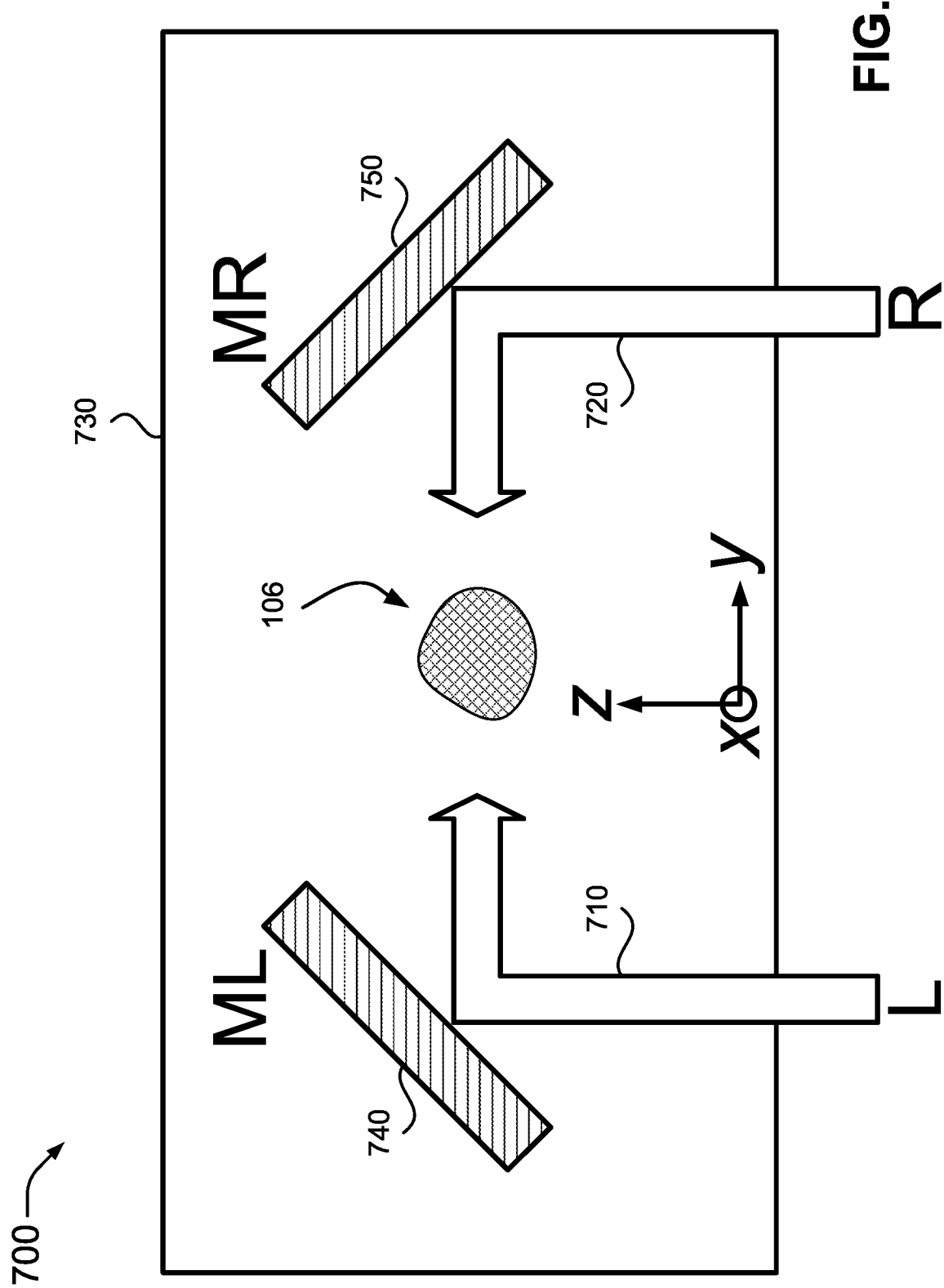
FIG. 7 illustrates an example of a platform with two folding mirrors in accordance with aspects of this disclosure.
Figure 8:
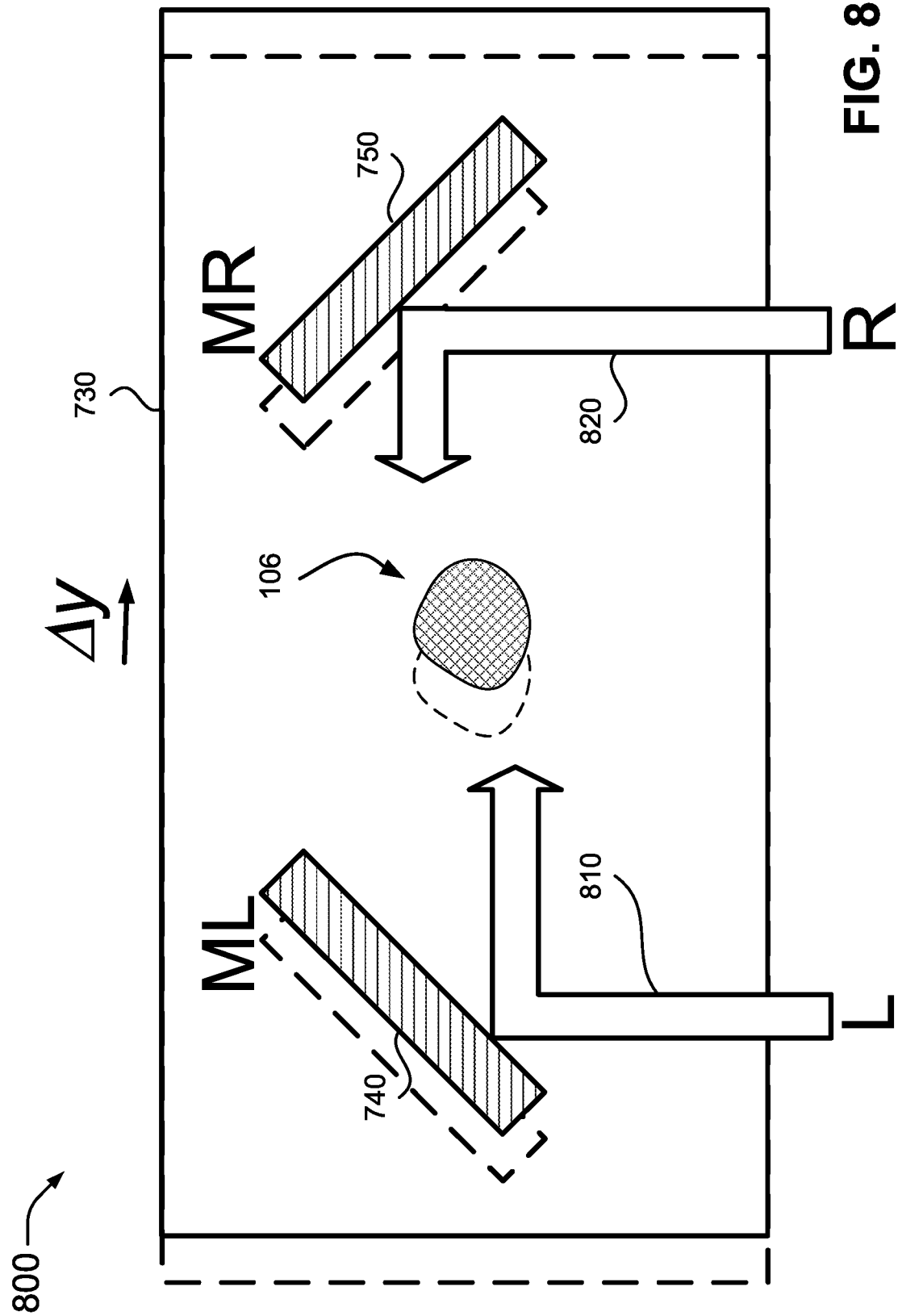
FIG. 8 illustrates an example of a mechanical vibration or disturbance of the platform along the optical axis in accordance with aspects of this disclosure.

FIG. 7 includes a diagram 700 that illustrates an example of a platform 730 with two (2) fold or folding mirrors (left mirror or ML 740 and right mirror or MR 750) that provide a solution to the issues described above related to changes in position due to vibrations affecting the fidelity of qubits requiring interferometric stability. The ion 106 is now on the platform 730, shown as a rectangle, although the platform 730 need not be limited to this shape or form. The mirrors ML 740 and MR 750 may be rigidly attached to the platform 730. Although not shown, an ion trap or a similar confining device may be used to hold the ion 106 in place may also be rigidly attached to the platform 730. As shown in the diagram 700, the optical path lengths of an L beam (i.e., the L beam 710) and an R beam (i.e., the R beam 720) are the same. The L and R beams are parallel beams when provided to the platform 730.

Each of the mirrors ML 740 and MR 750 may comprise a single optical component or a group of optical components to provide the necessary folding, bending, or redirection of the corresponding optical beam. These optical components need not be limited to mirrors and may include other types of optical components that may effectively change the direction of an optical beam.

As noted above, while the example illustrated in FIG. 7 may have the ion 106 held in place by a confining device (e.g., an ion trap such as the ion trap 270) rigidly attached to the platform 730, the same or similar condition can be provided for a different type of qubit where the device or structure used to confine the qubit in a location or position is also rigidly attached to the platform 730. That is, the trap or confining device is such that the ion-based qubit or other type of qubit is thereby rigidly referenced to the folding mirrors (ML 740 and MR 750).

In the diagram 700 there are two optical axes, which may be referred to as the input optical axis (Z axis) and the ion optical axis (Y axis) which are the same as defined above in connection with the typical geometry. Also shown is the perpendicular axis to the plane of the diagram 700 (X axis).

It is important to note that the L beam 710 and the R beam 720, which are provided in parallel by an imaging system, for example, do not typically move in connection with mechanical vibrations that affect the location or position of the platform 730 that contains the ion 106. In other words, the source or sources of the L beam 710 and the R beam 720 are mechanically decoupled from the platform 730. Thus, the place and direction where the L beam 710 and the R beam 720 are provided to the platform 730 typically do not move or change and are therefore considered to be fixed. In contrast, the platform 730 with the qubit and the folding mirrors moves in response to mechanical vibrations. If the L beam 710 and the R beam 720 move, they tend to have a common translational movement that does not result in the introduction on phase differences at the ion 106.

Because the ion 106, through its confining device, is rigidly attached to the platform 730, and so are the folding mirrors ML 740 and MR 750, the ion 106 and the folding mirrors have a common motion. Thus, when the ion 106 is disturbed along the ion optical axis (Y axis), the overall path length of the L and R beams is unchanged, as shown in a diagram 800 in FIG. 8.
This is shown by having the optical path length of the L beam (i.e., the L beam 810) to the ML 740 and then from the ML 740 to the ion 106 be the same as the optical path length of the R beam (i.e., the R beam 820) to the MR 750 and then from the MR 750 to the ion 106. In other words, for the L beam 810, the distance to the ML 740 decreases but the distance from the ML 740 to the ion 106 increases. For the R beam 820, the distance to the MR 750 increases but the distance from the MR 750 to the ion 106 decreases. Therefore, there is no optical phase difference imparted to the ion 106.

Figure 9:
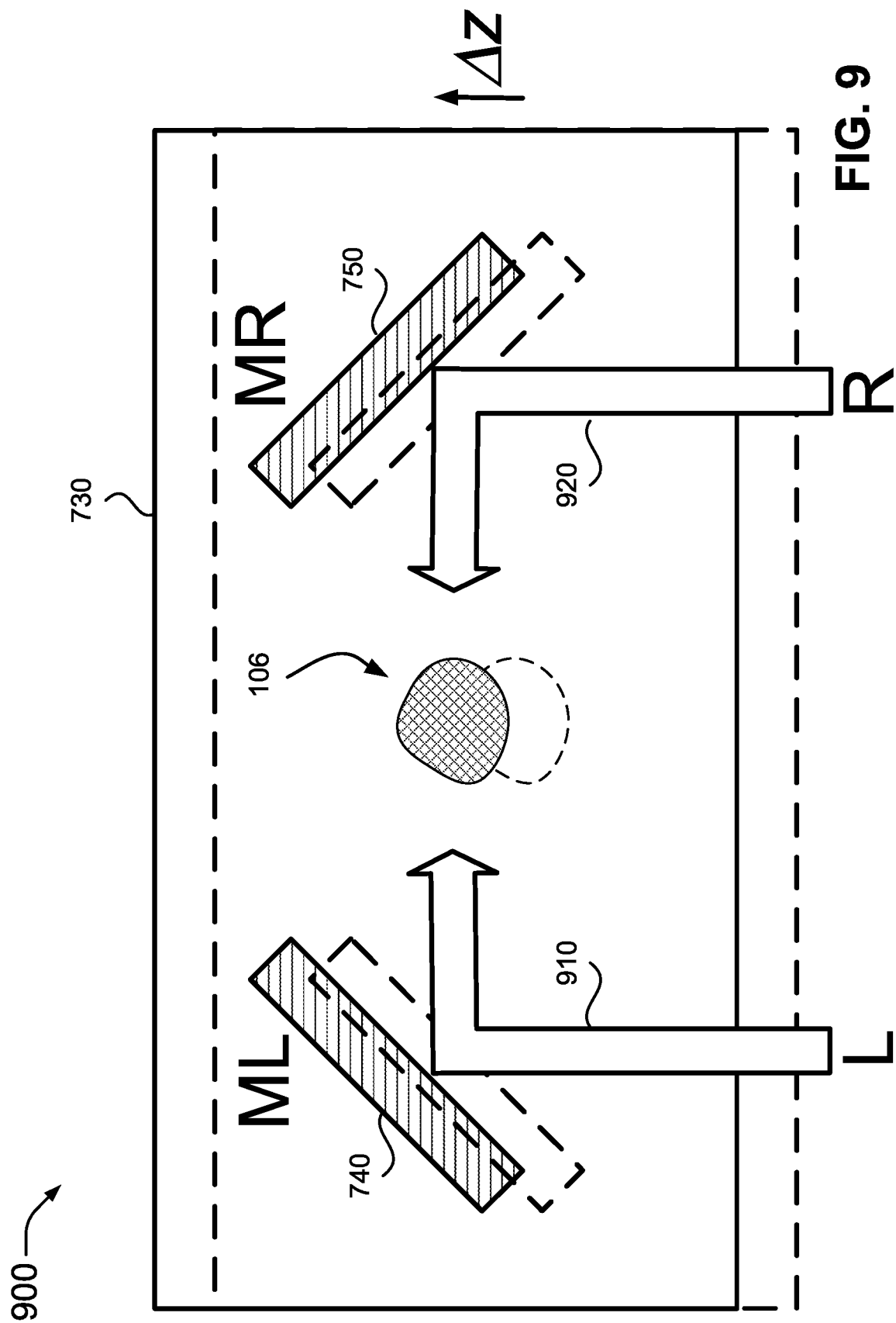
FIG. 9 illustrates an example of a mechanical vibration or disturbance of the platform perpendicular to the optical axis in accordance with aspects of this disclosure.

A disturbance along the input optical axis (Z axis), as shown in the diagram 900 in FIG. 9, leads to a common mode phase shift, and results in the optical path lengths of the L beam (i.e., the L beam 910) and the R beam (i.e., the R beam 920) to increase equally because the ML 740 and the MR 750 have moved by the same distance. By converting the phase difference into a common mode phase, there is no change in the optical phase difference and thus no effect on fidelity. There is also no intensity difference because the ion optical axis follows the disturbance along the Z axis.

Because the mirrors (ML 740 and MR 750) only fold along one orthogonal axis, a disturbance along the other direction perpendicular to the optical axis (X axis), will have the same effect as in the typical geometry. There will be no change in path length.

The platform 730 with the rigidly attached folding mirrors 740 and 750 may be positioned inside a cryogenic environment within a QIP system, as shown in the example in FIG. 2. Such a cryogenic environment may be one of the sources of mechanical vibrations that affect the fidelity of qubits for which interferometric stability is important.

Figure 10:
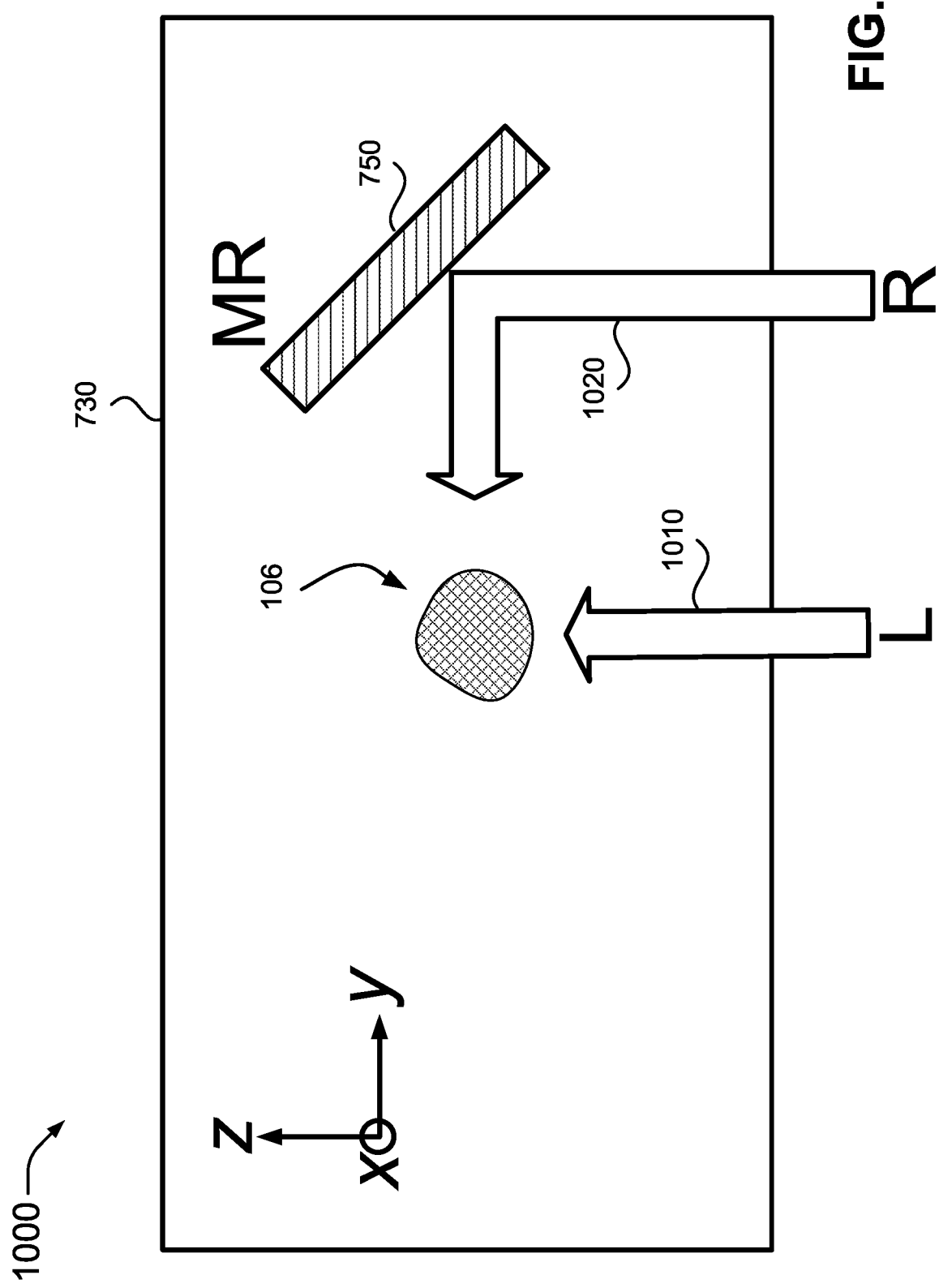
FIG. 10 illustrates an example of a platform with one folding mirror in accordance with aspects of this disclosure.

FIG. 10 includes a diagram 1000 that illustrates an example of the platform 730 with a single folding mirror, in this case the right mirror or MR 750. It is to be understood that a similar implementation may be achieved if the single mirror is the left mirror or ML 740 instead. As shown in the diagram 1000, the optical path lengths of the L beam (i.e., the L beam 1010) and the R beam (i.e., the R beam 1020) are different because the L beam is provided directly to the ion 106 without any kind of redirection and the R beam is provided to the ion 106 by being redirected using the MR 750. A motion of the platform 730 along the Z axis should not result in optical phase differences that affect qubit fidelity because any changes in the path length of the R beam are met by the same change in the path length of the L beam, even though the only beam that is redirected in this example is the R beam.

In connection with the above description, the present disclosure provides for a device or structure that reduces or removes the effects of mechanical vibrations on qubit fidelity for qubits that require interferometric stability. For example, the device or structure is configured to receive two or more parallel optical beams and is further configured to provide optical paths for the two or more parallel optical beams that minimize or reduce the introduction of phase differences on the optical beams provided to a qubit as a result of translational movement.

Such a device or structure may include a platform (e.g., the platform 730), a first folding mirror (e.g., the ML 740), a second folding mirror (e.g., the MR 750), and a confining device (e.g., the ion trap 270) that holds a qubit in position. The first folding mirror, the second folding mirror, and the confining device are rigidly attached to the platform. The first folding mirror is configured to receive as input a first optical beam (e.g., L beam) and redirect the first optical beam to the qubit in one direction, the second folding mirror is configured to receive as input a second optical beam (e.g., R beam) and redirect the second optical beam to the qubit in a different direction. The platform is configured to move in response to the mechanical vibrations while the first optical beam and the second optical beam that are received as inputs do not move in response to the mechanical vibrations.

In this device or structure, translational movement of the platform does not lead to optical phase differences at the ion, reducing or eliminating the effect of platform vibration on qubit fidelity.

In this device or structure, an optical axis is formed between the redirected first optical beam, the redirected second optical beam, and the qubit, and the platform is configured to move along an axis perpendicular to the optical axis without causing an optical phase difference imparted on the qubit by the redirected first optical beam and the redirected second optical beam and without causing a shift in optical intensity at the qubit. The optical axis and the perpendicular axis can be on the same plane as the platform.

The optical axis can be on the same plane as the platform and the perpendicular axis is perpendicular to the plane.

In this device or structure, the platform is configured to be placed inside a chamber and/or cryogenic environment in a QIP system (see e.g., FIG. 2).

In this device or structure, the qubit can be an ion, and the first optical beam and the second optical beam are Raman optical beams. The ion may be an ytterbium ion or a barium ion. The confining device may be an ion trap. The ion trap may be a surface trap made of evaporated electrodes on a glass substrate In this device or structure, the qubit can be a neutral atom, a Rydberg atom, a defect-based qubit, a quantum dot, or semiconductor-based qubit.

In this device or structure, the confining device can be further configured to hold additional qubits in respective positions, the first folding mirror is configured to receive as inputs additional first optical beams and redirect the additional first optical beams to the respective qubit of the additional qubits in the one direction, the second folding mirror is configured to receive as inputs additional second optical beams and redirect the additional second optical beams to the respective qubit of the additional qubits in the different direction. In some cases, the qubit and the additional qubits are the same type of qubit (e.g., made with the same type of qubit technology). The qubit and additional qubits may all be ions, and in some cases the qubit and additional qubits may include the ions of a same isotope of an atomic species, ions of different isotopes of an atomic species, or ions of different atomic species. The qubit and the additional qubits may be neutral atoms, Rydberg atoms, defect-based qubits, quantum dots, or semiconductor-based qubits.

In this device or structure, the one direction of the redirected first optical beam and the different direction of the redirected second optical beam may be opposite directions.

In this device or structure, the first folding mirror and the second folding mirror are positioned at a same distance from the qubit. This, however, need not always be the case and there may be implementations or configurations in which the first folding mirror and the second folding mirror are at different distances from the qubit.

In this device or structure, the sources of the first optical beam and the second optical beam are mechanically decoupled from the platform.

In this device or structure, the qubit is sensitive to phase differences arising from vibrations and requires interferometric stability (e.g., no change or minimal change to optical phase differences) to operate with good fidelity.

In this device or structure, the confining device may be further configured to hold additional qubits in respective positions. When at least two parallel optical beams are provided or received, including a first optical beam and a second optical beam, the first optical beam may overlap two or more ions, the second optical beam may overlap two or more ions, or both the first optical beam and the second optical beam may overlap two or more ions. That is, one or more of the optical beams may cover or overlap more than one ion and may be redirected (where needed) accordingly.

The previous description of the disclosure is provided to enable a person skilled in the art to make or use the disclosure. Various modifications to the disclosure will be readily apparent to those skilled in the art, and the common principles defined herein may be applied to other variations without departing from the scope of the disclosure. Furthermore, although elements of the described aspects may be described or claimed in the singular, the plural is contemplated unless limitation to the singular is explicitly stated. Additionally, all or a portion of any aspect may be utilized with all or a portion of any other aspect, unless stated otherwise. Thus, the disclosure is not to be limited to the examples and designs described herein but is to be accorded the widest scope consistent with the principles and novel features disclosed herein.

What is claimed is:

1. A device for reducing the effects of mechanical vibrations on qubit fidelity, the device comprising:
    a platform;
    one or more folding mirrors; and
    a confining device configured to hold at least one qubit in a position, the one or more folding mirrors and the confining device are rigidly attached to the platform, the one or more folding mirrors are configured to receive a first optical beam and a second optical beam parallel to each other and redirect one or both of the first optical beam and the second optical beam to the qubit, and the platform is configured to move in response to the mechanical vibrations while sources of the first optical beam and the second optical beam are mechanically decoupled from the platform.

2. The device of claim 1, wherein the one or more folding mirrors include a first folding mirror configured to redirect the first optical beam to the qubit and a second folding mirror configured to redirect the second optical beam to the qubit.

3. The device of claim 2, wherein:
    an optical axis is formed between the redirected first optical beam, the redirected second optical beam, and the qubit, and
    the platform is configured to move along the optical axis without causing a change in optical phase difference imparted on the qubit by the redirected first optical beam and the redirected second optical beam.

4. The device of claim 2, wherein:
    an optical axis is formed between the redirected first optical beam, the redirected second optical beam, and the qubit, and
    the platform is configured to move along an axis perpendicular to the optical axis without causing a change in optical phase difference imparted on the qubit by the redirected first optical beam and the redirected second optical beam.

5. The device of claim 4, wherein the optical axis and the perpendicular axis are on the same plane as the platform.

6. The device of claim 4, wherein the optical axis is on the same plane as the platform and the perpendicular axis is perpendicular to the plane.

7. The device of claim 2, wherein the first folding mirror and the second folding mirror are both positioned at 45-degree angles to respectively redirect the first optical beam and the second optical beam to the qubit.

8. The device of claim 1, wherein the platform is configured to be placed inside a chamber or cryogenic environment in a quantum information processing (QIP) system.

9. The device of claim 1, wherein the qubit is an ion, and the first optical beam and the second optical beam are Raman optical beams.

10. The device of claim 9, wherein the ion is an ytterbium ion or a barium ion.

11. The device of claim 9, wherein the confining device is an ion trap.

12. The device of claim 1, wherein the qubit is a neutral atom, a Rydberg atom, a defect-based qubit, a quantum dot, or a semiconductor-based qubit.

13. The device of claim 1, wherein the confining device is further configured to hold additional qubits in respective positions, the one or more mirrors are further configured to receive additional first optical beams and additional second optical beams and redirect some or all of the additional first optical beams and the additional second optical beams to their respective qubits of the additional qubits.

14. The device of claim 13, wherein the qubit and the additional qubits are the same type of qubit.

15. The device of claim 13, wherein the qubit and the additional qubits are ions, the ions include ions of a same isotope of an atomic species, ions of different isotopes of an atomic species, or ions of different atomic species.

16. The device of claim 13, wherein the qubit and the additional qubits are neutral atoms, Rydberg atoms, defect-based qubits, quantum dots, semiconductor-based qubits, or a combination thereof.

17. The device of claim 1, wherein the one or more mirrors include a single folding mirror, the first optical beam is provided to the qubit without redirection, and the second optical beam is redirected to the qubit by the single folding mirror.

18. The device of claim 1, wherein the first optical beam and the second optical beam share at least one of the one or more mirrors.

19. The device of claim 1, wherein the first optical beam and the second optical beam are provided to the qubit in opposite directions.

20. The device of claim 1, wherein the confining device is further configured to hold additional qubits in respective positions, and one or both of the first optical beam and the second optical beam overlap more than one qubit.

* * * * *